United States Patent [19]
Myerson

[11] Patent Number: 5,892,917
[45] Date of Patent: Apr. 6, 1999

[54] SYSTEM FOR LOG RECORD AND LOG EXPANSION WITH INSERTED LOG RECORDS REPRESENTING OBJECT REQUEST FOR SPECIFIED OBJECT CORRESPONDING TO CACHED OBJECT COPIES

[75] Inventor: Terry J. Myerson, Sunnyvale, Calif.

[73] Assignee: Microsoft Corporation, Redmond, Wash.

[21] Appl. No.: 534,488

[22] Filed: Sep. 27, 1995

[51] Int. Cl.$^6$ .................................................. G06F 7/02
[52] U.S. Cl. ...................................... 395/200.54; 395/838
[58] Field of Search .................... 340/825.33; 379/34; 380/4; 395/184.01, 651, 200.54, 200.53, 838, 892

[56] References Cited

U.S. PATENT DOCUMENTS

| | | | |
|---|---|---|---|
| 3,727,186 | 4/1973 | Stephenson, Jr. et al. | 340/825.33 |
| 4,220,771 | 9/1980 | Kraushaar et al. | 379/138 |
| 4,559,416 | 12/1985 | Theis et al. | 379/34 |
| 5,023,907 | 6/1991 | Johnson et al. | 380/4 |
| 5,051,944 | 9/1991 | Fetterolf et al. | 395/184.01 |
| 5,428,785 | 6/1995 | Morel et al. | 395/651 |
| 5,675,510 | 10/1997 | Coffey et al. | 395/200.54 |

*Primary Examiner*—Thomas C. Lee
*Assistant Examiner*—Anderson I. Chen
*Attorney, Agent, or Firm*—Lee & Hayes, PLLC

[57] ABSTRACT

A system and method for analyzing a Web site log file and generating an expanded log file that compensates for information caching and gateway based Web site access. More particularly, the log file expansion procedure of the present invention works with a log file stored in memory on the server computer. The log file contains a sequence of log records, each log record representing an object request by a client computer. Each log record includes data identifying the requested object as well as some data, such as an Internet address, associated with the client computer or a gateway through which the client computer requested the object. The log expansion procedure analyzes the sequence of log records so as to detect object request patterns indicating that object requests not represented by the log records were satisfied by cached object copies, and then supplements the sequence of log records with inserted log records representing object requests for the objects corresponding to the cached object copies. As a result, the supplemented sequence of log records more accurately represents object requests made by client computers than the initial sequence of log records in the log file. Usage metering and analysis procedures utilized the supplemented sequence of log records to generate analysis reports indicative of object request patterns by the client computers.

34 Claims, 6 Drawing Sheets

SYSTEM FOR LOG RECORD AND LOG EXPANSION WITH INSERTED LOG RECORDS REPRESENTING OBJECT REQUEST FOR SPECIFIED OBJECT CORRESPONDING TO CACHED OBJECT COPIES

The present invention relates generally to metering the usage of resources located on a wide area network, and particularly to a system for expanding the access log files associated with World Wide Web sites and other remotely accessible information sites to compensate for gateway based accesses and information caching so as to generate a more statistically accurate log of usage of information at a particular site, and for analyzing the expanded log files so as to meter usage of a particular site and to meter usage of distinctly identified resources within that site.

BACKGROUND OF THE INVENTION

Worldwide Web (WWW) sites are commonly known as "servers" while the computers that are used to access information stored on the servers are commonly known as "clients." A WWW site on the Internet produces a chronological log of requests from clients on the Internet. The protocol of the WWW is stateless, meaning that there is no sustained connection between the client and server. Typically, a WWW site contains numerous "pages" of information, and all the pages are interconnected by hypertext links to form an directed graph of pages.

In most instances, a client will first access the "home page" of a WWW site, and then will access a sequence of pages at the site via the hypertext links between those pages. In addition, each page at a WWW site can include references to numerous files, typically image files, that must be downloaded onto a client computer (i.e., a user's computer) before the page can be viewed. When a client computer requests a page that it has accessed via a hypertext link on another page, the "browser" software used on the client computer to access the WWW site will first download that page to local memory. Next it determines from the information In the requested page what additional files, if any, it needs from the server in order to complete the generation of the image for the page. It then downloads the additional files needed to complete generation of the image for the page, and then finally generates the page image for the user to view. Thus, to view a single page, the browser running on the client computer may request and download numerous files from a WWW site. Therefore, the number of object requests in the WWW site's access log file (often called "hits") will typically greatly exceed the number of distinct client sessions in which clients are accessing information from the WWW site.

The widespread use of gateways makes the access logs of WWW sites even less accurate, in that the access requests from numerous clients are routed through one or a small number of gateways to the WWW site. As a result, requests listed in a WWW site's access log where the gateway is the listed requestor may actually represent numerous distinct client sessions, even though the requests all come from the same client computer (the gateway) and even if those requests are received over a relatively short period of time that would otherwise be consistent with a single client session.

A second phenomenon, called caching, further reduces the accuracy of WWW site log files. Caching is the temporary storage of the files for recently accessed WWW pages. Most gateways make extensive use of WWW page caching so as to reduce the number of object requests that need to be issued to WWW sites, especially during peak usage periods when many users of the gateway are requesting the same WWW pages.

Statistically, certain WWW pages tend to be much more popular than others, especially the home pages of popular Web sites, and those pages tend to be cached by gateways, as well as other computers, thereby greatly reducing the number of object request entries in the corresponding Web site log files compared to the number of client sessions actually accessing those popular pages. Note that many client sessions handled by gateways will access Web pages from gateways' caches, and thus the true entry point object requests for those sessions will often not appear in the corresponding Web site log files. Furthermore, for client sessions that access only the most popular pages at a Web site during peak usage periods, it is quite possible that all the accessed pages will be cached pages, and thus no object requests at all for such client sessions will appear in the corresponding Web site log files.

Web page caching is performed not only by gateways, but also by many local area networks as well as by individual desktop computers. As with caching by gateways, such caching tends on a statistical basis to reduce the number of log file entries for the most popular Web pages.

It is an object of the present invention to convert Web site log files into expanded log files that compensate, on a statistically accurate basis, for object requests not included in the site log files.

It is another object of the present invention to generate expanded Web site log files that accurately represent the relative distribution of actual client requests for the different objects at a Web site and to thereby overcome the log file inaccuracies caused by object caching by gateways, network servers and other computers.

It is a further object of the present invention to assign object requests in the expanded log files to synthesized client sessions so as to represent, in a statistically accurate manner, the number of client sessions accessing a Web site and the distribution of objects accessed by those client sessions.

Another object of the present invention Is to generate analyses of Web site usage based on an expanded log file that represents in a statistically accurate manner the information access patterns of the clients of the Web site.

SUMMARY OF THE INVENTION

In summary, the present invention is a system and method for analyzing a Web site log file and generating an expanded log file that compensates for information caching and gateway based Web site access. The expanded log file represents in a statistically accurate manner the information access patterns of the clients of the Web site, although the individual synthesized client sessions represented by the expanded log file do not necessarily represent actual client sessions.

More particularly, the log file expansion procedure of the present invention works with a log file stored in memory on the server computer. The log file contains a sequence of log records, each log record representing an object request by a client computer. Each log record includes data identifying the requested object as well as some data, such as an Internet address, associated with the client computer or a gateway through which the client computer requested the object. The log expansion procedure analyzes the sequence of log records so as to detect object request patterns indicating that object requests not represented by the log records were satisfied by cached object copies, and then supplements the sequence of log records with inserted log records representing object requests for the objects corresponding to the cached object copies. As a result, the supplemented sequence of log records more accurately represents object requests made by client computers than the initial sequence of log records in the log file.

Usage metering and analysis procedures utilize the supplemented sequence of log records to generate analysis reports indicative of object request patterns by the client computers.

The log expansion procedure furthermore assigns session identifiers to each log record so as to group the sequence of log records into pseudo-client sessions. It then detects when log records are missing from the pseudo-client sessions and supplements the sequence of log records with log records representing additional object requests so as to create pseudo-client sessions each having a logical sequence of object requests.

In another aspect of the invention, the log expansion procedure includes a reference object request profile indicative of relative object request rates for at least a subset of the client accessible objects stored on the server computer, as well as instructions for generating current object request frequency data based on the objects referenced by the supplemented sequence of log records. It compares the current object request frequency data with the reference object request profile, and whenever the current object request frequency data differs from the reference object request profile by more than a threshold amount, it inserts additional log records representing entirely synthesized pseudo-client sessions which request objects under represented by the current object request frequency data and also adds log records representing additional requests by existing pseudo-client sessions.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
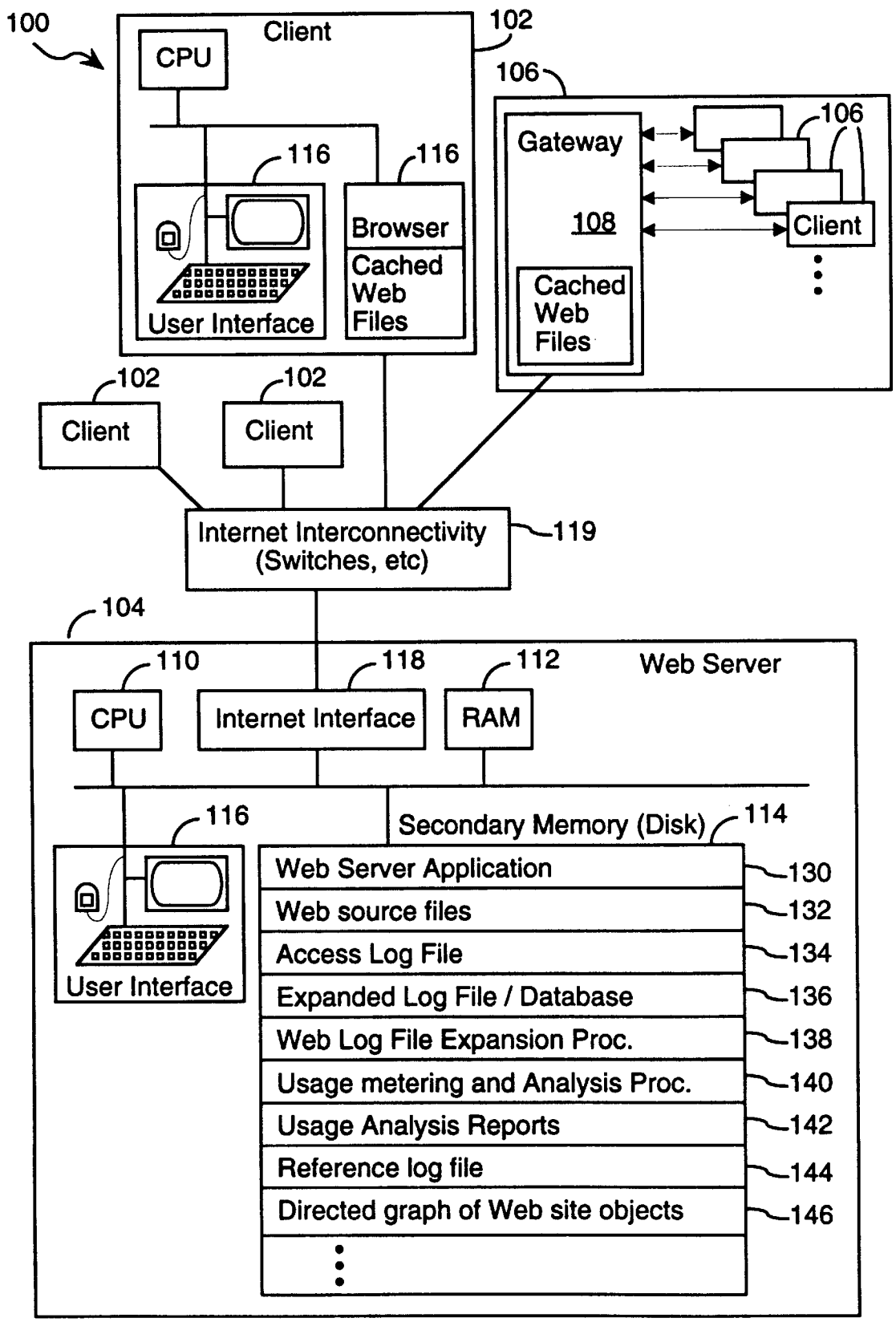
FIG. 1 is a block diagram of a distributed computer system incorporating the present invention.

Referring to FIG. 1, there is shown a distributed computer system 100 having many client computers 102 and at least one information server computer 104. In many instances, a set of client computers 106 will be connected to the information server 104 indirectly through a gateway 108. In many contexts the gateway will be the computers associated with a provider of various electronic services, including Internet access. Common examples of such gateways are the private wide area networks provided by CompuServe, America OnLine and Prodigy.

In the preferred embodiment, each client computer 102, 106 is connected to the information server 104 via the Internet 119, although other types of communication connections could be used. While most client computers are desktop computers, such as IBM compatible computers and Macintosh computers, virtually any type of computer can be a client computer so long as it can be used to accesses Web servers using a Web browser program.

The information server 104 includes a central processing unit 110, primary memory 112 (i.e., fast random access memory) and secondary memory 114 (typically disk storage), a user interface 116, an Internet interface 118 for communication with the client computers 102 via the Internet 119. For the purposes of the present discussion, it will be assumed that the information server 104 is a World Wide Web Server, and thus a Web Server application 130 is stored in the secondary memory 114 for execution by the server's CPU 110. The Web Server application 130 controls the server's responses to requests by client computers to retrieve files using standard WWW protocols. The Web Server application works with a set of Web source files 132, which are the documents and other files or objects that client computers receive in response to properly formed requests. The present invention does not modify the Web Server application, nor the Web source files. Thus, operation of a WWW site insofar as client computers are concerned remains unchanged by the present invention.

An access log file 134 is maintained by the Web Server application and is simply a record of every request received from a client computer. In accordance with the present invention, the access log file 134 is periodically processed and converted into an expanded log file and database 136 by a web log file expansion program 138. The expanded log file is then processed by a Web site usage metering and analysis program 140 that generates a set of analysis reports 142 representing information on the numbers of client computers which accessed various Web source files in separate access sessions. The log file expansion process will be described in more detail below.

Some additional files stored by the Web Server are a reference log file 144 and a weighted directed graph file 146. The reference log file 144 is a log file that contains a set of object request records representing the "true" relative frequency of requests for the various objects at the Web site that are accessible via client requests when no caching of objects is being performed by any client computers. The reference log file 144 may be generated, for instance, by responding to all object requests during a test period with responses indicating that the object's validity will expire immediately, thereby preventing the objects from being cached. The resulting log file will indicate the true frequency of requests for objects in the Web site, since all caching will have been disabled.

Figure 2:
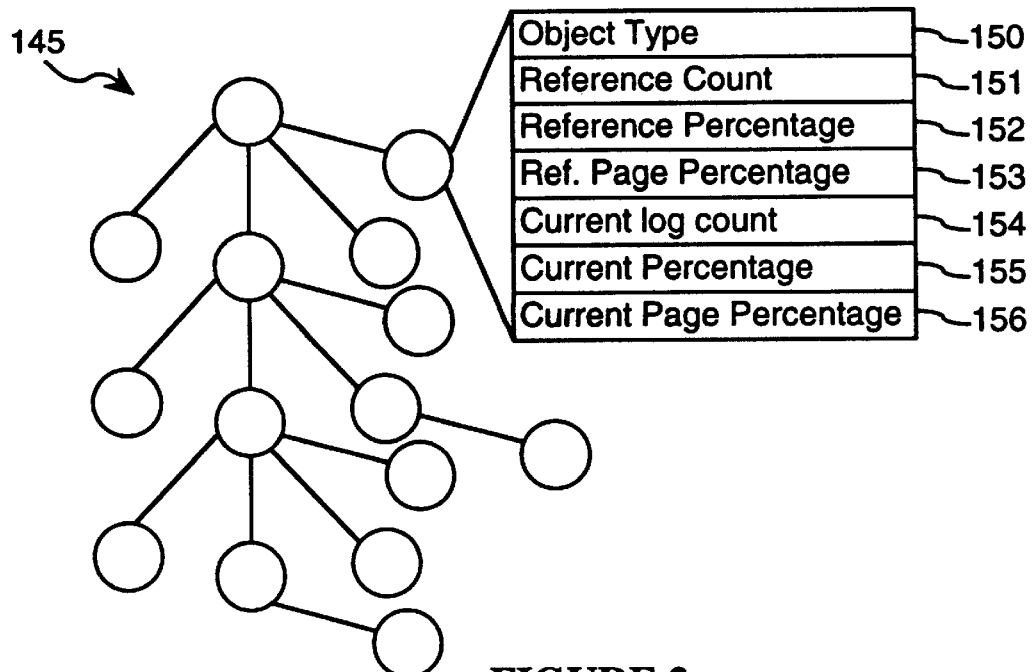
FIG. 2 is a block diagram of a weighted directed graph of the objects stored at a Web site.

Referring to FIG. 2, the directed graph file 146 stores data representing a directed graph of all the objects at the Web site, as well as "weight data" representing the relative frequency of requests for the various objects associated with the Web site. In particular, for each node of the directed graph, the weight data in the directed graph includes:

a flag 150 indicating whether the object is a page file;

a count value 151 indicating the number of requests for the object in the reference log file;

a percentage value 152 for the requests of the object in the reference log file (i.e., representing the percentage of all object requests in the reference log file that are requests for this object);

a page-based percentage value 153 for the object if it is a page file (i.e., representing the percentage of all page file requests in the reference log file that are requests for this page file);

a count value 154 indicating the number of requests for the object in the current log file;

a percentage value 155 for the requests of the object in the current log file (i.e., representing the percentage of all object requests in the current log file that are requests for this object); and a page-based percentage value 156 for the object if it is a page file (i.e., representing the percentage of all page file requests in the current log file that are requests for this page file).

Figure 3:
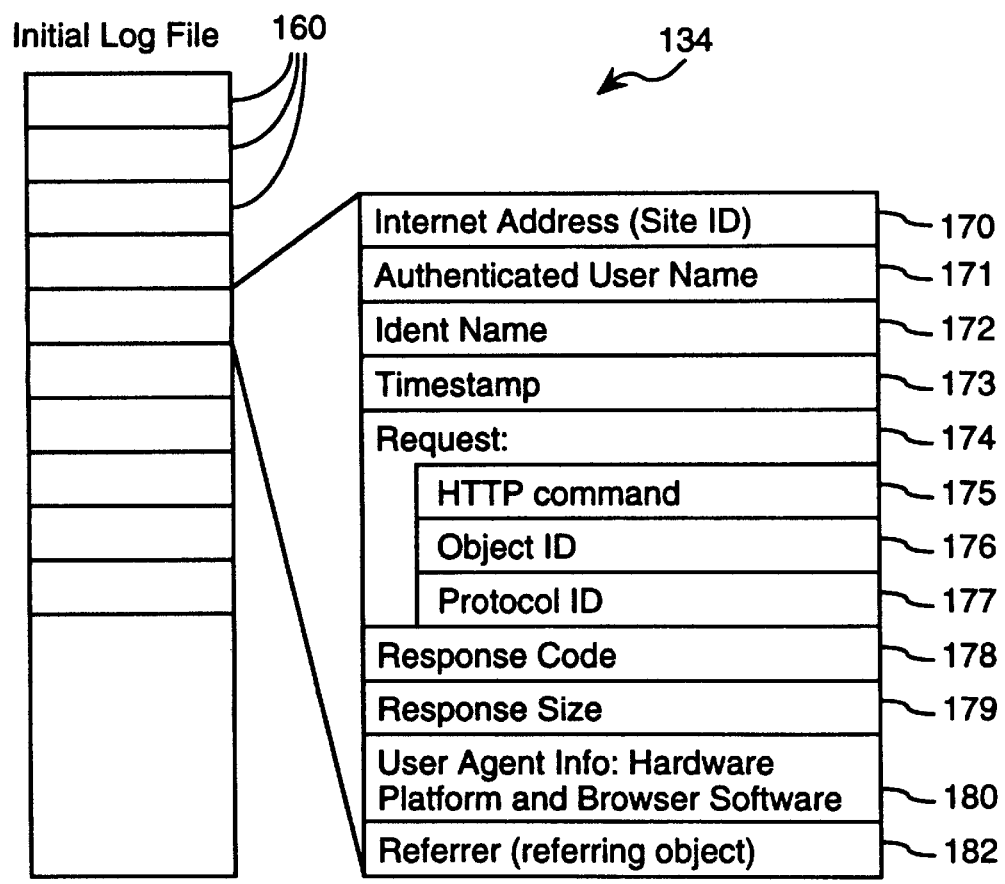
FIG. 3 is a block diagram of a conventional Web site log file.

Referring to FIG. 3, the initial, unexpanded log file for a Web site consists of a sequence of records 160 that are stored in chronological order, each record indicating information about a single communication between a client computer and the Web site. In a typical Web site's log file, each record 160 includes information representing:

the Internet address 170 of the requester, which in the case of a client accessing the Web site through a gateway will identify the gateway, but in the case of a client accessing the site from a corporate local area network or wide area network will usually identify the corporation and often a suborganization of the corporation associated with the client;

the Authenticated User name 171 of the requester, which is usually blank, unless the Web site requires registration of client computers, in which case the Authenticated User name is stored here;

the Ident name 172, which is provided only if the client computer uses an Ident server;

a timestamp 173, which specifies the starting time of the communication between the client computer and the Web site;

the request 174 made by the client, which includes the HTTP command used 175, the object ID 176 of the object requested by the client, and the protocol ID 177, which identifies the request protocol used by the client;

a response code 178, which indicates how the Web server responded to the client computer's request; and a response size 179, which indicates the amount of information sent back to the client computer in response to its request.

In addition, a small but growing number of Web site servers are storing additional information in their access log files, including information representing:

user agent information 180, particularly information representing the hardware platform of the client computer (e.g., the brand name and model of the computer and the operating system being used) and the browser software being used; and the "referrer" 182, which is the object used by the client computer to get the URL address of the object requested during the communication represented by the instant log record 160.

The referrer field 182 will be blank if the URL address of the requested object was typed directly into the browser by the client. Otherwise, there is always a referrer. In many other cases, if the referrer field 182 indicates an object request not found in the log file, that information can be used to detect use of a cached Web page. Of course, if a client computer accesses a sequence of cached pages, which is not unusual, the referrer field 182 in the log file is of limited utility in determining the cached pages accessed by a client. In addition, at the time of the filing of this document most Web site log files do not include a referrer field 182, and therefore even that limited source of information about the use of cached pages is not available in most unexpanded Web site log files.

Figure 4:
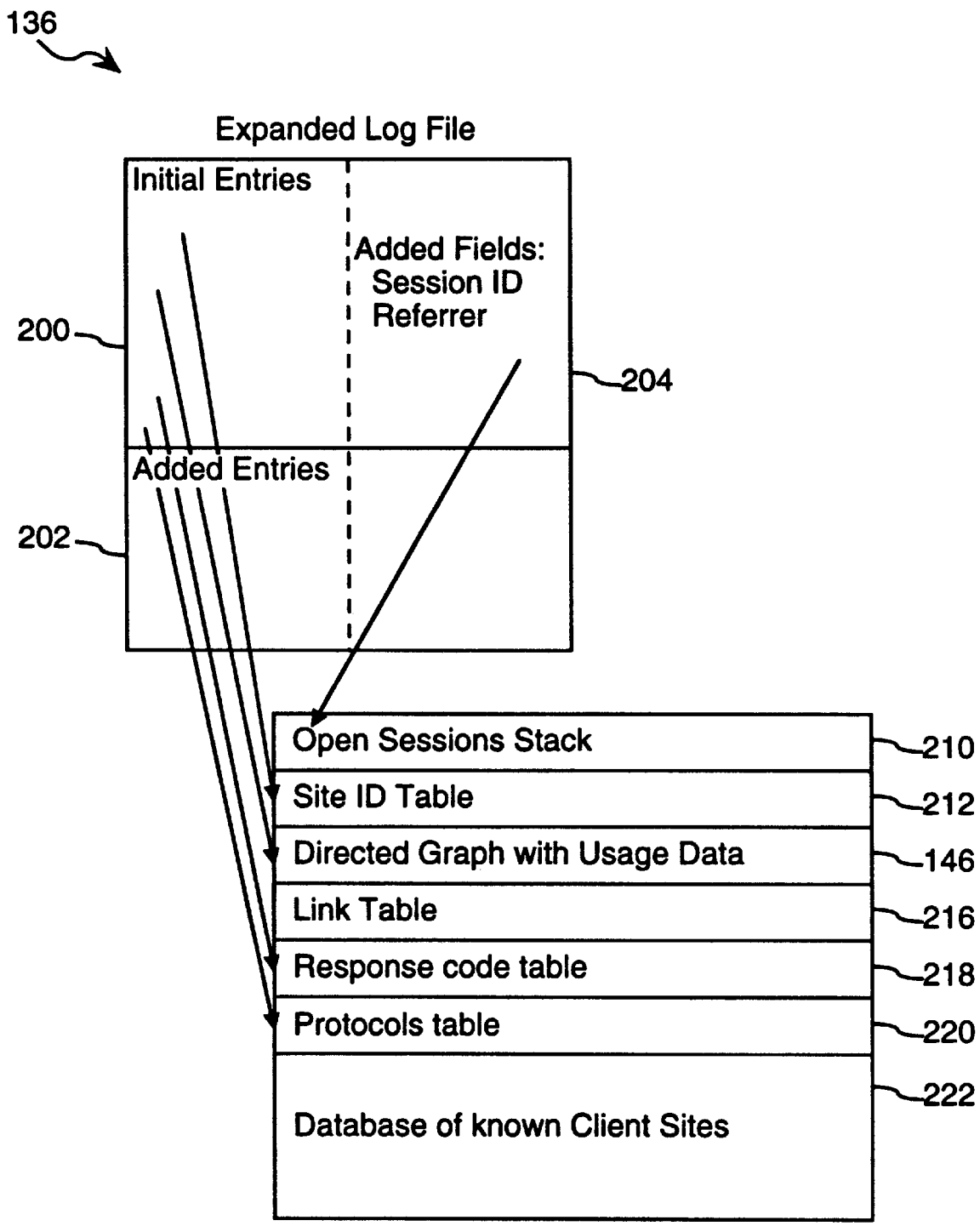
FIG. 4 is a block diagram of the expanded Web site log file generated by a preferred embodiment of the present invention.

Referring to FIG. 4, the expanded log file and database 136 generated by the present invention includes the Initial entries 200 found in the initial log file 134, added entries 202 representing client request log records synthesized by the log expander procedure of the present invention, and additional fields 204 added by the log expander procedure to both the initial entry records 200 in the expanded log file as well as the added entry records 202. The expanded log file 136 also includes a number of database files, including:

a sessions "stack" 210, which is used to keep track of pseudo-client sessions created by the log file expansion procedure 138 (FIG. 1);

a Site ID table 212 for listing all the Internet addresses in the log records being processed by the log file expansion procedure;

the previously mentioned directed graph 146, which is used as an object table with weighted usage data for keeping track of the number of requests for each object in the expanded log file;

a link table 216 for tracking the sequence of objects accessed by each pseudo-client session;

a response code table 218 for listing all the distinct response codes in the log records being processed by the log file expansion procedure 138;

a protocols table 220 for listing all the protocols referenced in the log records being processed by the log file expansion procedure 138; and a database 222 of known client sites for mapping Internet addresses into names of corporations and other entities, which is employed by the usage metering and analysis procedures 140 (FIG. 1).

It is noted that the Open Sessions Stack 210, Site ID table 212, Link table 216, response code table 218 and protocol table 220 are not parts of a permanent database, but rather are used only temporarily during log file processing. The directed graph 146 is durably stored as a database file for periods of a day or so, and the table of known client sites 222 is stored on a long term basis.

Figure 5A:
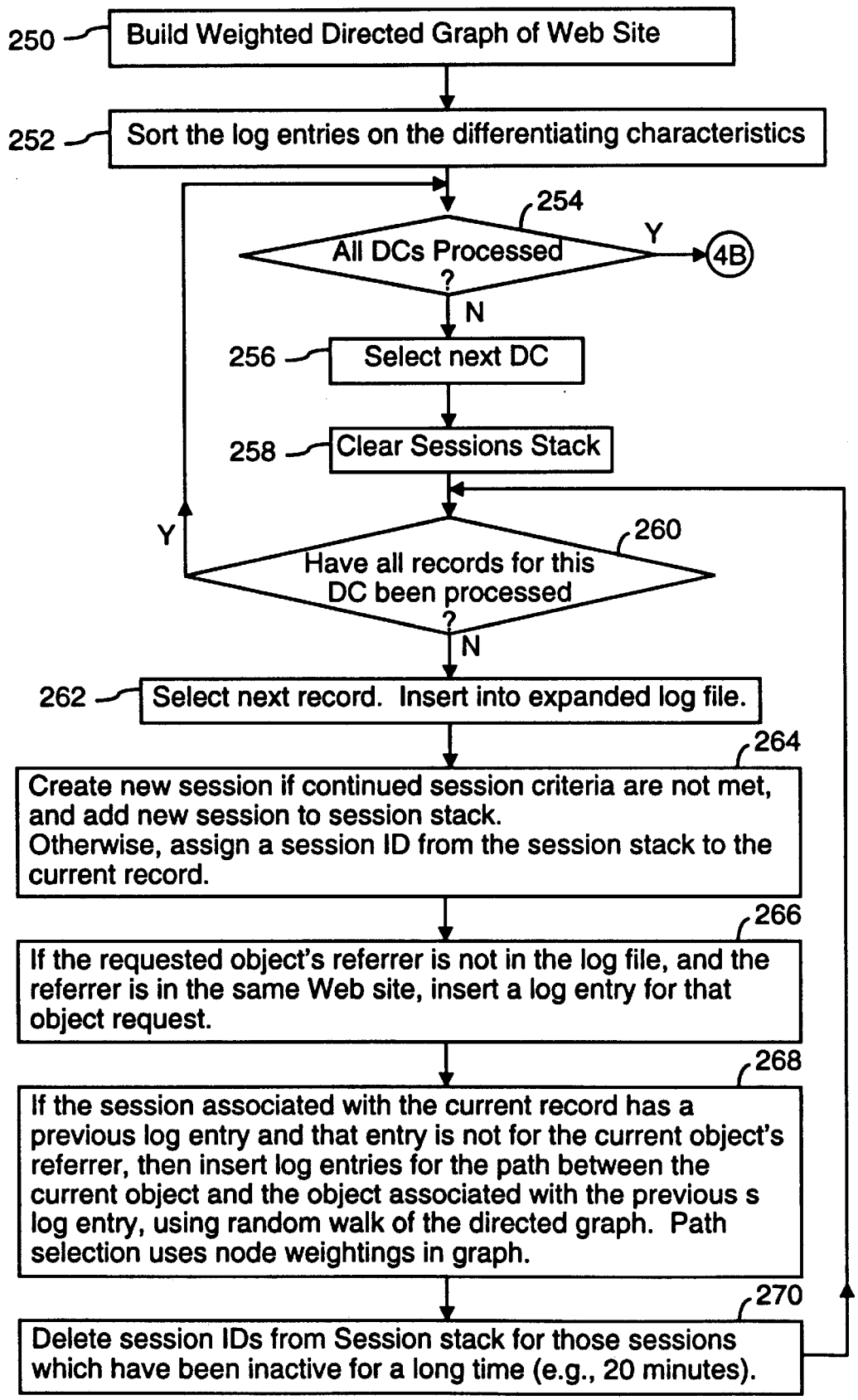
FIG. 5, 5A, and 5B are a flow chart of the Web site log file expansion procedure as implemented in a preferred embodiment of the present invention.
Figures 5, 5A, 5B:
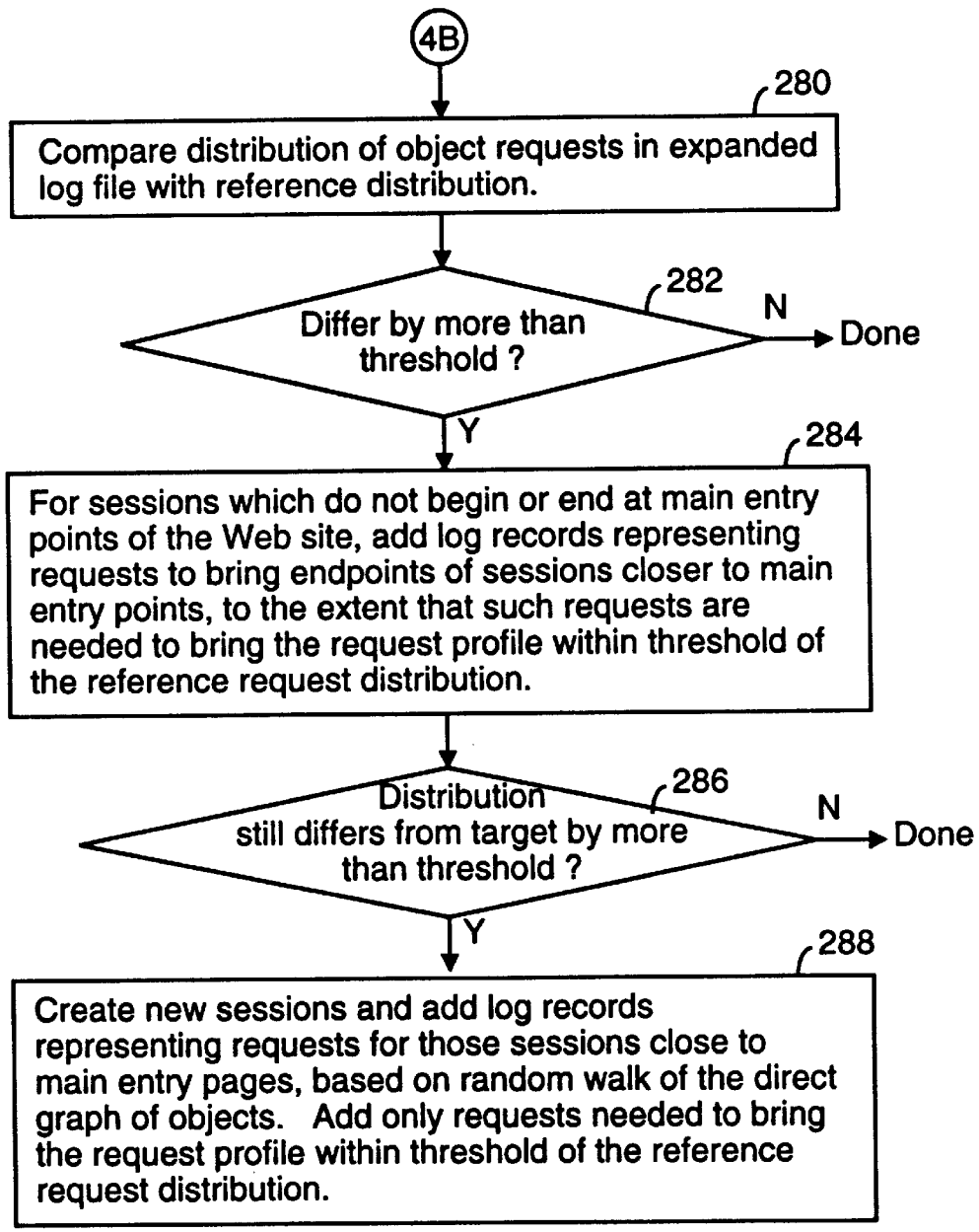

Referring to FIG. 5 and the pseudocode shown in Table 1, the log file expansion procedure begins by accessing all the objects associated with the Web site pages and building a directed graph 146 of all the objects at the site, and then using the reference log file 144 to add "weight data" to the directed graph 146 (see FIG. 2) so as to represent the "true" or historical relative frequency of requests for the various objects associated with the Web site (step 250), Step 250 will typically be executed once per day, while the remaining steps of the procedure are typically executed more frequently, such as once per hour. At the beginning of the more frequent executions of the procedure, the log records are sorted on a set of differentiating characteristics (DCs), which in the preferred embodiment are the Internet address, authenticated user name, ident name, the HTTP command format, and protocol fields of the records in the unexpanded log file (step 252). It is noted that log records having distinct DCs must be associated with different client sessions, because all the records from a single client session will use the same browser, originate from the same Internet address, use the same Web protocol and request format, and thus all requests from a single client session will have identical DCs. The log records within each DC group are also sorted chronologically if they are not already in chronological order.

Assuming that the log records for at least one set of DCs found in the log file have not yet been processed (step 254), the next distinct set of DCs found in the log file is selected (step 256) and the associated records are processed. In particular, the session stack is cleared (step 258), a next record having the selected set of DCs is selected (step 262), assuming that the last record for the selected set of DCs has not yet been processed (step 260). The selected log record is added to the expanded log file (step 262).

It should be noted that the next few steps are designed to generate "synthesized client sessions" or "pseudo-client sessions" from the log records by determining which log records could be part of the same client sessions. The sessions generated and session ID assigned to log records are not meant to necessarily track actual client sessions, although that will often be the case. Rather, the goal of this procedure is to generate sessions that are, on average, statistically representative of client sessions.

As the log records for a selected set of DCs are processed, if the data in the currently selected record is inconsistent with it being part of any of the open sessions generated for the currently selected set of DCs, then a new session ID is generated and added to the Open Session stack, and the current log record is labelled with the new session ID (step 264). The currently selected record is assigned a new session ID if it is the first request in the DC group, its referrer is external to the Web site server, or a large time gap (e.g., 20 minutes) exists between the current request and the previous request.

In addition, if a log record represents a request for an entry page and has a response code of "200," indicating that the client session requested information as to whether or not the object has been modified since a particular date, a new session ID is assigned to that log record and the new session ID is added to the Open Session stack. The reason for this is that most often, when a client session requests an entry page and also asks for an object modification update, this means that the client computer has a cached copy of the requested object but is starting a new client session.

The portion of the log expansion procedure that assigns a session identifier to each log record, as represented by step 264, is sometimes herein called the session identifier assigning means, or the session identifying means.

It is noted that session IDs are not reused, even after they are deleted from the Open Session stack, but rather are assigned in a sequential matter. While the session IDs need not be assigned sequentially, they must be globally unique. In this way, pseudo-client sessions generated by the log expansion procedure are preserved (via the session IDs stored in the expanded log file records), allowing further processing of the pseudo-client sessions represented in the expanded log file even after all the initial log records have been processed.

If the selected record is not assigned a new session ID, then it is assigned a session ID from the Open Session stack (step 264) based on best matching open session as deter-mined by the relative directed graph positions of the current object (referenced by the current log record) and last object referenced for each such open session. If the referrer of the requested object (referenced by the current log record) is in the same Web site, and a request for that referrer is not found in the log file with the same set of DCs, then the referred object was accessed from a local cache by the client computer, and a corresponding log entry representing the client computer's request for the cached referrer object is added to the expanded log file (step 266).

Next, if the session associated with the current record has a previous log entry and that previous log entry does not represent a request for the current object's referrer, that indicates the client computer most likely accessed cached objects between the time it requested the objects associated with the previous and current log entries. In fact, the cached objects accessed will most likely have been along the path of the directed graph between the objects associated with the previous and current log entries. As a result, the log expansion procedure inserts log entries for object request along the path between the current object and the object associated with the previous log entry, using a random walk of the directed graph to select the objects requested by each of the inserted log records (step 268). During the path selection process for adding log records, the reference usage frequency data In the directed graph is used to help select the object to be requested by each new inserted log entry, and the new log entries are assigned timestamps that are evenly spaced in time between the times associated with the current and previous log records. All of these added log records are assigned the same session ID as the current log record being processed.

After processing each log record, the open sessions listed in the Open Session stack are checked. Whenever the last record assigned to each such open session has a timestamp value that is more than 20 minutes for the timestamp of the current log record, that open session is deleted from the Open Session stack (step 270). This step is based on the premise that time delays of greater than 20 minutes between object requests are unusual in actual client sessions.

This process continues for all the log records for each distinct set of DCs (steps 254, 256, 258 and 260). As each log record is added to the expanded log file, including both the initial log records and all generated or inserted log records, the current log count value 154 in the directed graph 146 of the Web site's objects is updated to reflect the number of requests for each such object.

At step 280, the log expansion procedure compares the distribution of object requests in the expanded log file with the reference distribution of requests for objects at the log site. If these two distributions differ by more than a predefined threshold (step 282), this means that the percentage of object requests to the Web site being satisfied by cached objects is relatively high.

Figure 6:
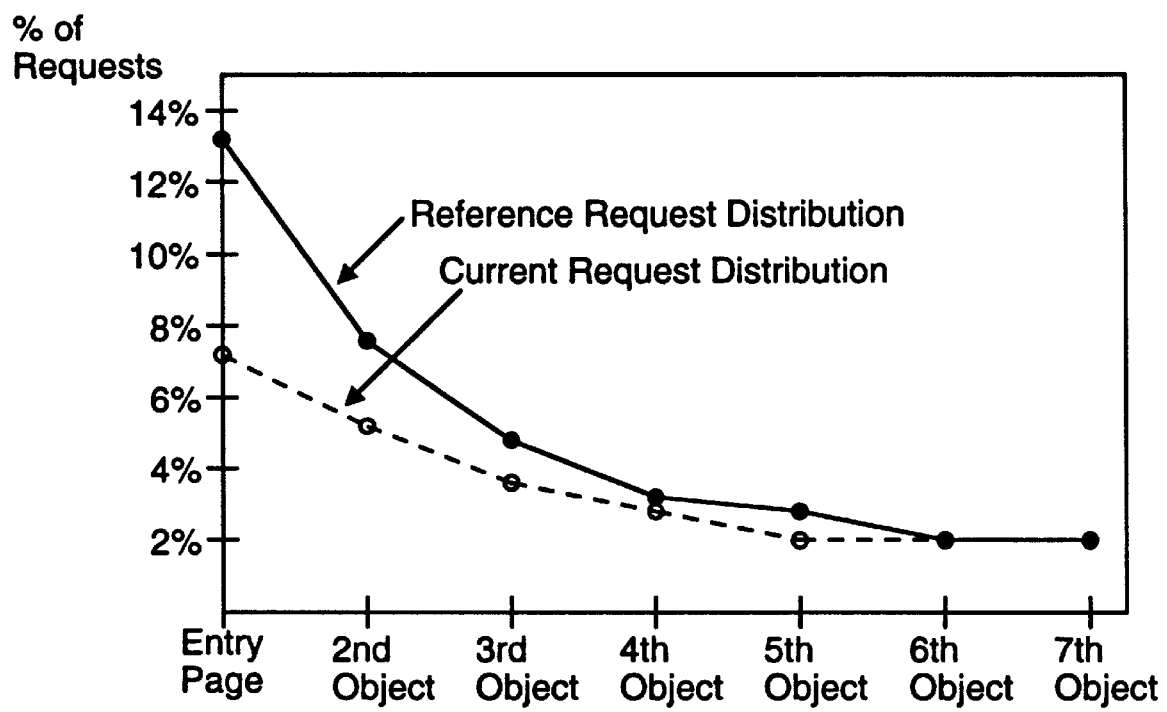
FIG. 6 is a chart showing a comparison of a reference or true object request frequency profile without object caching and the object request frequency profile in the presence of object caching.

Referring to FIG. 6, there is shown a graphical representation of the request profile data used for determining when the reference and current request distributions differ by more than the threshold. For instance, one definition of the test for detecting a high object caching rate is as follows:

X=sum of the reference percentage weights of the most frequently requested objects (e.g., the top 25%) in the reference log file;

Y=sum of the current percentage weights of the same objects;

Z=(Y-X)Y

If Z>0.15, then the threshold has been reached.

In other words, In one preferred embodiment, if the frequency of requests for the most popular objects is at least 15% lower than the frequency of requests found in the reference request profile, then the threshold amount of object caching for performing additional log entry insertion has been detected. As will be understood by those of ordinary skill in the art, numerous slightly different procedures can be used to compare the current and reference request profiles for the purpose of detecting high rates of object caching.

Usually, it is the pages and associated objects closest to the Web site's main entry points that are cached, and during peak usage periods when these objects are referenced most frequently, the rate of which the most popular objects are requested can actually drop to close to zero, while the rate of access to the least frequently requested objects remains largely unchanged during peak usage periods. When this "peak usage" condition (also called a "high caching rate" condition) is detected, the log file expansion procedure Inspects the pseudo-client sessions previously defined in the expanded log file, as represented by the session IDs in those log records, identifies sessions which do not begin or end at the main entry points of the Web site, and adds log records representing object requests that bring the endpoints of those sessions closer to the main entry points of the Web site (step 284). In most cases, when object requests are added to the expanded log file, the added log records include requests for entry pages associated with the Web site. The object request frequency data for the current log file is updated to include object requests corresponding to all added log records. Such log records are added only to the extent that the corresponding object requests are needed to bring the request profile closer to the reference object request distribution.

The portions of the log expansion procedure that supplements the log records with inserted log records based on the completion of pseudo-client sessions having at least one log record included in the initial log records, as represented by steps 266, 268 and 280–284, is sometimes herein called the session supplementing means.

If the distribution of object requests still differs from the reference object request distribution by more than the pre-defined threshold (step 286), that tends to indicate that many entire client sessions have not been logged because all the object requests during those client sessions were satisfied from cached objects. To correct or compensate for such "complete session caching," the log expansion procedure creates entirely new sessions (i.e., assigned new session IDs) and adds log records to the expanded log file representing object requests for those new sessions. The object requests for the new sessions always start at the main entry points of the Web site and remain fairly close to those main entry points, based on a random walk of the directed graph of objects that is bounded so as to stay within the set of objects having the highest request rates. Object request log records are added to the expanded log file for new sessions only to the extent needed to bring the current request profile within the predefined threshold of the reference object request distribution. The portion of the log expansion procedure that inserts entire new pseudo-client sessions into the expanded log file, as represented by steps 286–288, is sometimes herein called the session insertion means.

After the expanded log file has been generated, the expanded log file is then processed by a Web site usage metering and analysis program 140 that generates a set of analysis reports 142 representing information on the numbers of client computers which accessed various Web source files in separate access sessions. These reports indicate:

frequency of usage of the various pages at the Web site, including the total number of distinct pseudo-client sessions per time of day or day, and the percentage of client sessions which viewed each particular page;

average session duration average number of Web pages viewed per session the geographic distribution of client computers, as determined by the Internet address information in the expanded log file and the database of known client sites; and the number of failed requests for objects.

Alternate Embodiments

It is noted that the log file expansion procedure not be resident on the server computer, so long as it has access to the server computer's log file and can access the Web site as to determine the logical connections between the client accessible objects on the Web site.

The processing of log records could be performed in real time, without first storing the log records in a log file. Individual requests to the Web site could be passed through the log expansion procedure of the present invention as if they had been read sequentially from the log file. In this case the expansion file database would be built in real time.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

PSEUDOCODE REPRESENTATION
OF LOG FILE EXPANSION PROCEDURE

```
Sort the request stream on the differentiating characteristics (DCs),
    including Internet address, authentication name, ident name, client
    request format, protocol
/*  All log records for single user session will have the same DCs */
/*  Build a directed graph of the Web site */
    Call Request (EntryPage)
    Subroutine Request(Object)
        {
        Web Get Object
        Record in the directed graph the requested Object and each
            Linked Object referenced by the fetched object
        For each Linked Object referenced by the fetched object,
            Call Request (Linked Object)
        }
/*  Weight the directed graph */
    Total = total number of object requests in the access log
    For each node of the directed graph
        {
        Count = number of requests for that node in reference
        access log
        Weight of node = Count / Total
        }
For each DC group
    {
    Sort the log records in chronological order.
    Clear the Open Session stack.
    For each log record in the DC group:
        If {(the referrer of the current request is external to the
            server) or (a "large" time gap exists between the
            current request and the previous request) or (this is
            the first request in the DC group) or (an entry page
            has been requested and has a "200" response code)}
        {
        Create new session ID, assign it to the current request, and add
            it to the Open Session stack.
        }
    Else
        {
        If the current object's referrer is not in the request stream, then
            {
```

TABLE 1-continued

PSEUDOCODE REPRESENTATION
OF LOG FILE EXPANSION PROCEDURE

```
        Insert a referrer request into the request stream
        }
    A Session ID from the Open Session stack is assigned to the
        current request based upon:
    a)  The session ID for which the last requested object is nearest
        in the directed graph, based on a random walk of the graph;
        or
    b)  The session ID on top of the stack (i.e, the most recently
        assigned Session ID).
    If the session associated with the current request has a previous
        request, and there is no direct graph connection between the
        previous and current objects
        {
        Insert into the expanded log file requests connecting the
        previous and current objects. The path is determined by
        a random walk of the graph. Inserted requests are
        evenly spaced in time.
        Further weight the direct graph based on the inserted
            requests.
        }
Based on the timestamp of the current request record, check to
    see if the elapsed time between the time associated with the
    current request record and that of the most recent request
    for each Session ID in the Open Session ID stack exceeds a
    large threshold time gap (e.g., 20 minutes). Delete those
    Session IDs from the Open Session ID stack for which the
    elapsed time since the most recent request is larger than the
    threshold time gap.
}
For each given time period of a given length (e.g., a one hour time period)
    {
    Build a list of requested objects, sorted by frequency (percent) of
        requests.
    Compare the distribution of object requests with the distribution
        found in the weighted directed graph of objects.
    If the distribution of object requests differs from the reference
        distribution by more than a predefined threshold,
        supplement the expanded log with "additional assumed
        request entries" as follows:
        {
        For sessions which do not begin or end at main entry
            points, add log entry records representing
            requests to bring these endpoints closer to main
            entry pages to the extent that such requests are
            needed to bring request profile within threshold
            of reference request distribution.
        To the extent that still further requests are needed to bring
            request profile within threshold of reference
            request distribution, create new, entirely
            synthesized pseudo-client sessions and add
            requests for those sessions close to main entry
            pages based on random walks of the directed
            graph of objects. All request insertions follow a
            path along the graph. Request insertions are
            made only to the extent that they stabilize the
            request distribution.
        }
```

What is claimed is:

1. In a distributed computer system including client computers that request and receive object data structures (objects) from a server computer, said distributed computer system including at least one computer that includes a cache for temporary caching copies of objects stored on said server computer, a log file processing subsystem associated with the server computer, comprising:

a log file, stored in memory on said server computer, containing log records, each log record representing an object request by one of said client computers, said log record including data identifying the requested object and data associated with said client computer or a gateway within said distributed computer system through which said client computer requested said object;

log expansion means for analyzing said log records to detect object request patterns indicating that object requests not represented by said log records were satisfied by cached object copies, and for supplementing said log records with inserted log records representing object requests for specified objects corresponding to said cached object copies; wherein said supplemented log records more accurately represent object requests made by said client computers for objects stored on said server computer than said log records prior to said supplementing with inserted log is records; and usage metering and analysis means for generating analysis reports indicative of object request patterns by said client computers.

2. The log file processing subsystem of claim 1, said log expansion means including means for assigning session identifiers to each said log record so as to group log records into a plurality of pseudo-client sessions, each pseudo-client session being represented by a subset of the log records in said log records, and session supplementing means for detecting when log records are missing from said pseudo-client sessions and for supplementing said log records with log records representing additional object requests so as to create pseudo-client sessions each having a logical sequence of object requests.

3. The log file processing subsystem of claim 1, said log expansion means including means for assigning session identifiers to each said log record so as to group log records into a plurality of pseudo-client sessions, each pseudo-client session being represented by a subset of the log records in said log records, and session supplementing means for detecting when log records associated with requests for entry point objects normally requested at the beginning of most client sessions are missing from said pseudo-client sessions and for supplementing said log records with log records representing additional object requests for said entry point objects.

4. The log file processing subsystem of claim 1, said log expansion means including:

session identifying means for assigning session identifiers to each said log record so as to group log records into a plurality of pseudo-client sessions, each pseudo-client session being represented by a subset of the log records in said log records;

a reference object request profile indicative of relative object request rates for at least a subset of the client accessible objects stored on said server computer;

means for generating current object request frequency data based on the objects referenced by said supplemented log records; and session supplementing means, enabled when said current object request frequency data differs from said reference object request profile by more than a threshold amount, for detecting when log records associated with requests for entry point objects normally requested at the beginning of most client sessions are missing from said pseudo-client sessions and for supplementing said log records with log records representing additional object requests for said entry point objects.

5. The log file processing subsystem of claim 1, said log expansion means including a first object request profile indicative of relative object request rates for at least a subset of the client accessible objects stored on said server computer; and means for generating current object request frequency data based on the objects referenced by said supplemented log records, for comparing said current object request frequency data with said first object request profile, and for inserting additional log records representing entirely synthesized pseudo-client sessions which request objects under represented by said current object request frequency data when said current object request frequency data differs from said first object request profile by more than a threshold amount.

6. The log file processing subsystem of claim 5, said log expansion means Including means for generating an expanded log file that stores said supplemented log records;

said usage metering and analysis means generating analysis reports based on said supplemented log records stored in said expanded log file.

7. In a distributed computer system including client computers that request and receive object data structures (objects) from a server computer, said distributed computer system including at least one computer that includes a cache for temporarily caching copies of objects stored on said server computer, a method for processing and supplementing a log file, comprising the steps of:

storing said log file in memory on said server computer, said log file containing log records, each log record representing an object request by one of said client computers, said log record including data identifying the requested object and data associated with said client computer or a gateway within said distributed computer system through which said client computer requested said object;

analyzing said log records to detect object request patterns indicating that object requests not represented by said log records were satisfied by cached object copies, and supplementing said log records with inserted log records representing object requests for specified objects corresponding to said cached object copies; wherein said supplemented log records more accurately represent object requests made by said client computers for objects stored on said server computer than said log records prior to said supplementing with inserted log records; and gathering analysis reports, based on said supplemented log records, indicative of object request patterns by said client computers.

8. The method of claim 7, including:

assigning session identifiers to each said log record so as to group log records into a plurality of pseudo-client sessions, each pseudo-client session being represented by a subset of the log records in said log records, detecting when log records are missing from said pseudo-client sessions, and supplementing said log records with log records representing additional object requests so as to create pseudo-client sessions each having a logical sequence of object requests.

9. The method of claim 7, including:

assigning session identifiers to each said log record so as to group log records into a plurality of pseudo-client sessions, each pseudo-client session being represented by a subset of the log records in said log records, detecting when log records associated with requests for entry point objects normally requested at the beginning of most client sessions are missing from said pseudo-client sessions, and supplementing said log records with log records representing additional object requests for said entry point objects.

10. The method of claim 7, including:

assigning session identifiers to each said log record so as to group log records into a plurality of pseudo-client sessions, each pseudo-client session being represented by a subset of the log records in said log records;

storing a reference object request profile indicative of relative object request rates for at least a subset of the client accessible objects stored on said server computer;

generating current object request frequency data based on the objects referenced by said supplemented log records; and when said current object request frequency data differs from said reference object request profile by more than a threshold amount, detecting whether log records associated with requests for entry point objects normally requested at the beginning of most client sessions are missing from said pseudo-client sessions and supplementing said log records with log records representing additional object requests for said entry point objects.

11. The method of claim 7, including:

storing a reference object request profile indicative of relative object request rates for at least a subset of the client accessible objects stored on said server computer;

generating current object request frequency data based on the objects referenced by said supplemented log records;

comparing said current object request frequency data with said first object request profile, and inserting additional log records representing entirely synthesized pseudo-client sessions which request objects under represented by said current object request frequency data when said current object request frequency data differs from said first object request profile by more than a threshold amount.

12. The method of claim 7, including:

generating an expanded log file that stores said supplemented log records; and said step of generating analysis reports utilizing said supplemented log records stored in said expanded log file when generating said analysis reports.

13. A computer readable medium having computer-readable instructions for performing the steps in the method of claim 7.

14. In a distributed computer system including client computers that request and receive object data structures (objects) from a server computer, a log file processing subsystem comprising:

a log file, stored in memory accessible by the server computer, containing log records, each log record representing an object request from one of the client computers; and a log file expansion module executable on the server computer to analyze the log records for possible object request patterns which indicate that certain object requests are not represented by the log records, the log file expansion module supplementing the log records with inserted log records representing the certain object requests to create an expanded log file.

15. The log file processing subsystem of claim 14, further comprising a usage metering module executable on the server computer to generate analysis reports using the expanded log file.

16. The log file processing subsystem of claim 14, wherein the distributed computer system includes at least one computer with a cache for temporarily caching copies of objects stored on said server computer, the log file expansion module detecting object request patterns indicating that object requests not represented by said log records were satisfied by cached object copies stored on the one computer.

17. The log file processing subsystem of claim 14, wherein the log file expansion module groups log records from the log file into pseudo-client sessions and supplements individual pseudo-client sessions with additional log records so that the pseudo-client session has a logical sequence of object requests.

18. The log file processing subsystem of claim 14, wherein the log file expansion module groups log records from the log file into pseudo-client sessions and detects, for individual pseudo-client sessions, whether certain log records representing entry point objects normally requested at the beginning of client sessions are missing from the individual pseudo-client session and if so, supplementing the individual pseudo-client session with additional log records that represent the entry point objects.

19. The log file processing subsystem of claim 14, wherein the log file expansion module only supplements the log records if the current frequency of object requests at the server computer differs from a reference object request profile, which is indicative of relative object request rates for at least a subset of the client accessible objects stored on said server computer, by greater than a threshold amount.

20. For use in a server computer that serves object data structures (objects) to one or more client computers, wherein the server computer maintains a log file with log records and each log record represents an object request from one of the client computers, a log file processing program embodiment a computer-readable medium, comprising:
 a code segment to analyze the log records to detect object request patterns which indicate that certain object requests are not represented by the log records; and
 a code segment to supplement the log records with inserted log records representing the certain object requests.

21. The log file processing program of claim 20, further comprising a code segment to generate analysis reports using the supplemented log records.

22. The log file processing program of claim 20, wherein the distributed computer system includes at least one computer with a cache for temporarily caching copies of objects stored on said server computer, the log file processing program further comprising:
 a code segment to detect object request patterns indicating that object requests not represented by said log records were satisfied by cached object copies stored on the one computer.

23. The log file processing program of claim 20, further comprising a code segment to group log records from the log file into pseudo-client sessions.

24. The log file processing program of claim 23, farther comprising a code segment to supplement a pseudo-client session with additional log records so that the pseudo-client session has a logical sequence of object requests.

25. The log file processing program of claim 23, further comprising:

a code segment to detect, for a pseudo-client session, whether certain log records representing entry point objects normally requested at the beginning of most client sessions are missing from the pseudo-client session; and
 a code segment to supplement the pseudo-client session with the certain log records that represent the entry point objects in the event that the certain log records are missing.

26. The log file processing program of claim 20, farther comprising a code segment to determine if a current frequency of object requests at the server computer differs from a reference object request profile, which is indicative of relative object request rates for at least a subset of the client accessible objects stored on said server computer, by greater than a threshold amount.

27. In a distributed computer system including client computers that request and receive object data structures (objects) from a server computer, and wherein the server computer maintains a log file with log records that represent object requests from the client computers, a method for processing and supplementing a log file comprising the following steps:
 analyzing the log records in the log file to detect object request patterns which indicate that certain object requests are not represented by the log records; and
 expanding the log file with inserted log records representing the certain object requests.

28. The method of claim 27, further comprising the step of generating analysis reports using the expanded log file.

29. The method of claim 27, wherein the distributed computer system includes at least one computer with a cache for temporarily caching copies of objects stored on said server computer, the method further comprising the step of detecting object request patterns indicating that object requests not represented by said log records were satisfied by cached object copies stored on the one computer.

30. The method of claim 27, further comprising the step of grouping log records from the log file into pseudo-client sessions.

31. The method of claim 27, further comprising the step of supplementing a pseudo-client session with additional log records so that the pseudo-client session has a logical sequence of object requests.

32. The method of claim 27, further comprising the following steps:
 detecting, for a pseudo-client session, whether certain log records representing entry point objects normally requested at the beginning of most client sessions are missing from the pseudo-client session; and
 supplementing the pseudo-client session with the certain log records that represent the entry point objects in the event that the certain log records are missing.

33. The method of claim 27, further comprising the step of determining if a current frequency of object requests at the server computer differs from a reference object request profile, which is indicative of relative object request rates for at least a subset of the client accessible objects stored on said server computer, by greater than a threshold amount.

34. A computer readable medium having computer-readable instructions for performing the steps in the method of claim 27.

* * * * *